United States Patent [19]

Tarantino

[11] Patent Number: 4,790,103

[45] Date of Patent: Dec. 13, 1988

[54] SHELLFISH TRAP

[76] Inventor: John L. Tarantino, 921 Windflower, San Diego, Calif. 92106

[21] Appl. No.: 147,353

[22] Filed: Jan. 22, 1988

[51] Int. Cl.⁴ .............................................. A01K 69/08
[52] U.S. Cl. ....................................................... 43/102
[58] Field of Search .................. 43/102, 100, 103, 105

[56] References Cited

U.S. PATENT DOCUMENTS

| | | | |
|---|---|---|---|
| 3,245,173 | 4/1966 | Sylvester | 43/102 |
| 3,319,373 | 5/1967 | Gale | 43/100 |
| 3,497,989 | 3/1970 | Schultz | 43/100 |
| 4,221,070 | 9/1980 | Swindell | 43/100 |
| 4,611,424 | 9/1986 | Tarantino | 43/102 |
| 4,648,199 | 3/1987 | Deaton | 43/100 |

Primary Examiner—Gene P. Crosby
Attorney, Agent, or Firm—Brown, Martin, Haller & Meador

[57] ABSTRACT

A shellfish trap comprises a cage like mesh enclosure having a top wall, a bottom wall, and a peripheral side wall. The side wall has at least one entrance passageway extending from it towards the center of the enclosure. At least one ring for defining an escape vent is formed in the mesh of the enclosure, with ribs forming part of the mesh extending across the ring. A pilot indent is provided at the center of the ribs extending across the ring for receiving a drill bit to cut out the ribs to form an escape vent.

5 Claims, 2 Drawing Sheets

SHELLFISH TRAP

BACKGROUND OF THE INVENTION

The present invention relates generally to shellfish traps of the type intended to rest on the ocean floor to catch shellfish such as lobster, crab and shrimp.

Baited bottom traps to catch shellfish have long been employed by fisherman. In my U.S. Pat. No. 4,611,424 entitled "Selectable Entry Shellfish Trap", for example, a molded plastic trap is described, having an entrance passageway extending from the side wall to the center of the trap with an exit port at its inner end which can be cut out to the desired size according to the size of shellfish to be caught.

There are strict regulations regarding the size of shellfish which may be caught. This is to avoid capture of juvenile or immature shellfish which will lead to an excessive depletion in numbers. Thus, there are laws requiring that shellfish traps be provided with escape vents to allow the escape of shellfish under the legal size. These have the additional advantage that small unwanted creatures can escape from the trap, saving the fisherman time in sorting out the catch and discarding such unwanted or undersize creatures. Thus traps are sometimes provided with openings sufficiently large to permit the escape of small unwanted creatures or shellfish under the legal size. However, additional traps of smaller mesh size must then be purchased for trapping shrimp or similar small fish. Molded plastic traps have also been provided with suitable size escape vents or openings defined by rings built into the mesh, the openings being provided by cutting out the mesh by hand. This also requires purchase of different traps for each standard shellfish size. Also, laws requiring specific sizes, number and position of escape vents vary widely from state to state, so that different types of trap must be made available to conform with each set of requirements.

SUMMARY OF THE INVENTION

It is an object of the present invention to provide a shellfish trap in which escape vents can easily be provided as required.

According to the present invention, a shellfish trap is provided which comprises a cage like, lattice-work enclosure having a top wall, a bottom wall, and a peripheral side wall. At least one entrance passageway extends from the side wall towards the center of the enclosure. At least one ring for defining an escape vent is provided in the lattice-work of the enclosure, with ribs forming part of the lattice-work extending across the ring. A pilot indent is formed in the ribs at the center of the ring for receiving a drill bit for cutting out the ribbing inside the ring to form an escape vent as desired.

Thus, for example, a number of rings may be provided at appropriate locations in the same trap to conform with various different sets of legal requirements, with all the rings initially being closed with ribbing extending across them. The purchaser can then determine the escape vents required by law according to the area where the fishing is to take place and the type of shellfish to be caught, and can quickly and easily cut open the required vents using a drill bit which is centered automatically by location in the pilot indent. This allows the manufacturer of such traps to cut costs by making a single, standard trap which will be usable in areas having different legal requirements and to catch different types of shellfish.

In a preferred embodiment of the invention the trap has two diametrically opposed entrance passageways in its side wall. Two sets of rings for defining escape vents are provided opposite one another in the side wall. These vents are designed to conform with legal requirements for lobster traps in Hawaii. Additional rings of different dimensions are preferably provided for conforming with alternative requirements for catching different types of shellfish, such as Dungeness crab.

BRIEF DESCRIPTION OF THE DRAWINGS

The present invention will be better understood from the following detailed description of a preferred embodiment, taken in conjunction with the accompanying drawings in which like reference numerals refer to like parts and in which.

DESCRIPTION OF THE PREFERRED EMBODIMENT

Figure 1:
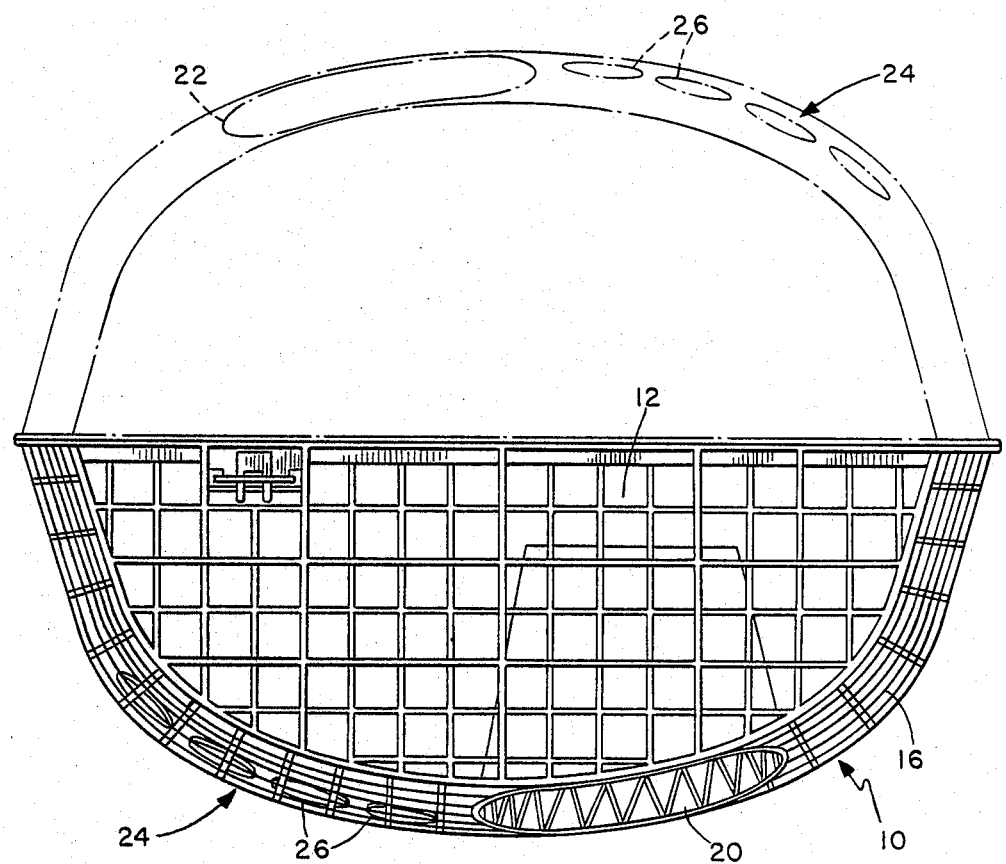
FIG. 1 is a top plan view of a shellfish trap incorporating the escape vent structure according to a preferred embodiment of the invention.
Figure 2:
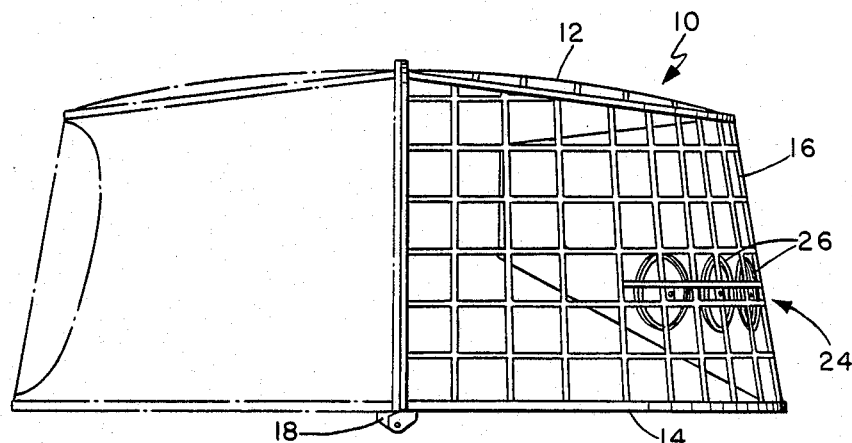
FIG. 2 is an end elevation view of the trap.

A shellfish trap 10 according to a preferred embodiment of the present invention is shown in the drawings. The trap comprises a cage-like, lattice-work or mesh enclosure of molded plastics material, and is similar in construction to the trap described in my U.S. Pat. No. 4,611,424 referred to above. The enclosure has a top wall 12, bottom wall 14, and peripheral upwardly and inwardly sloping side wall 16 of generally elliptical shape. In use, bottom wall 14 will rest on the ocean floor.

The trap is preferably formed from two identical molded half sections which are secured together by suitable releasable hinges 18, as described in U.S. Pat. No. 4,611,424. Two substantially opposed entrance passages 20,22 lead from the side wall in towards the center of the trap to provide a pathway for entry of the catch. An escape vent structure 24 comprising a row of four escape vent-defining rings 26 is provided adjacent each of the entrance passages. As seen in FIG. 1, the escape vent structures 24 are substantially diametrically opposed. The dimensions and position of the rings are selected to conform to legal requirements for escape vents for immature lobsters.

Figure 3:
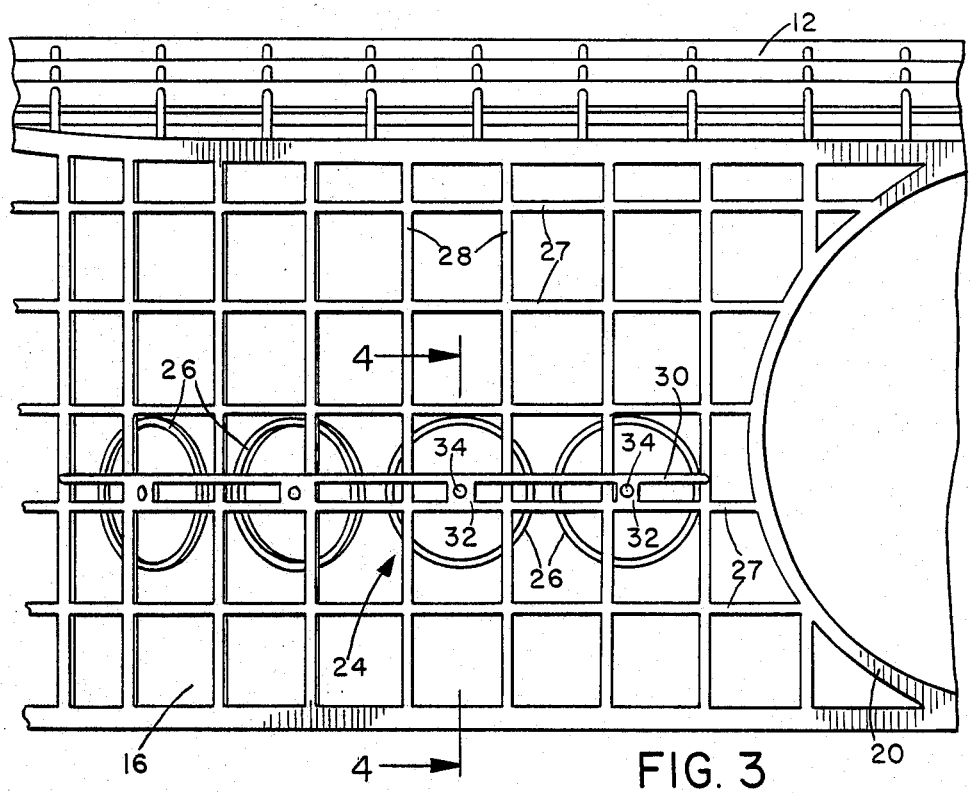
FIG. 3 is an enlarged side view of the escape vent structure.
Figure 4:
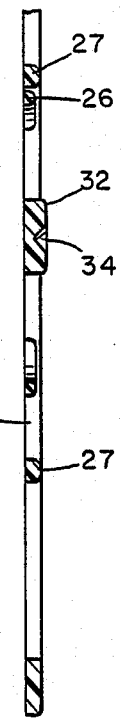
FIG. 4 is a sectional view taken on line 4—4 of FIG. 3.

The escape vent structure is shown in more detail in FIG. 3. The lattice work of the enclosure consists of transverse horizontal and vertical ribs 27,28, respectively, and the lattice-work ribs of the trap normally extend across the rings. An additional horizontal rib 30 extends across the row of rings adjacent an existing horizontal rib 27 of the lattice, and a thickened transverse web 32 extends between the ribs 27 and 30 at the center of each ring. A conical counter bore or pilot indent 34 is provided in the web 30 at the center of each ring. This indent will automatically receive and center the point of a drill bit used for cutting out the ribbing structure inside the ring when the escape vent is needed.

Figure 5:
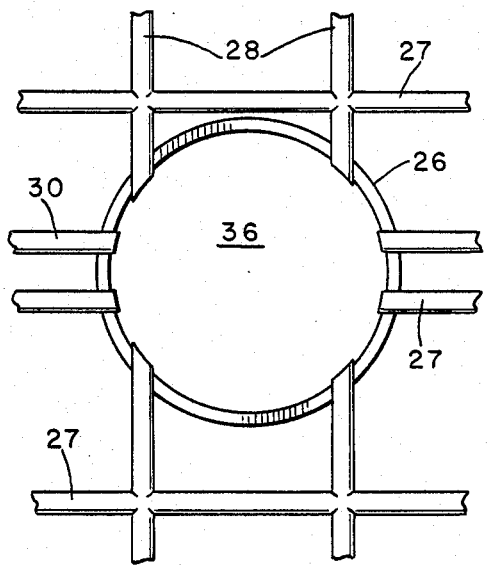
FIG. 5 is an enlarged view of a portion of FIG. 3, showing the escape vent structure cut away to provide the opening.

A through bore extending through web 32 may alternatively be provided to receive the point of a suitable drill. FIG. 5 shows one of the rings and the surrounding ribbing when the ribbing within the ring has been cut out by a suitably sized drill bit to leave a vent opening 36.

The rows of escape vent defining rings are provided high enough on the side walls above the bottom wall to be above the level of any weights within the trap for holding it on the ocean floor. The rings are positioned with their lowermost points no more than 85 mm above the bottom wall, and have a diameter of 67 mm. A gap of 15 mm is provided between adjacent rings. The escape vents must be situated so that they will be completely free of obstruction from any obstructions, such as trap bridles or other gear rigging, during all phases of fishing operations. Thus they are also situated a predetermined distance below the upper wall 12.

Although the dimensions and locations of the escape vents described above are particularly intended for lobster traps, additional escape vent structures (not shown) may be provided in a similar manner in the molded mesh-work of the trap to conform to legal requirements for other shellfish. Thus, for example, a ring for defining an escape vent large enough for immature Dungeness crab may be provided in the upper wall of the trap, and a suitable pilot hole or indent for allowing the hole to be cut out easily may be provided if desired.

The rings and additional ribbing and web for defining the pilot bore can be easily molded into the latticework structure of the enclosure, without any substantial modification to the existing die.

Thus identical escape vent structures can be provided in every trap inexpensively and easily, with the user determining whether or not a particular escape vent is required by law for his fishing operation and cutting out the escape vents as necessary. This avoids having to manufacture a variety of different traps having different dimensions and locations of escape vents, reducing manufacturing expense and thus the overall cost of the trap. The pilot indent provided in the ribbing normally closing the escape vent allows a suitably dimensioned drill bit to be centered automatically and easily for cutting out the ribbing to open the vent.

Although a preferred embodiment of the invention has been described above by way of example only, it will be understood by those skilled in the field that modifications may be made to the disclosed embodiment without departing from the scope of the invention, which is defined by the appended claims.

I claim:

1. A shellfish trap, comprising:
   a cage-like, lattice work enclosure of molded plastics material having an upper wall, a lower wall and a peripheral side wall;
   the side wall having at least one entrance passage extending from the side wall towards the center of the enclosure;
   at least one ring formed in the lattice-work of the enclosure for selectively defining an escape vent;
   the ring having ribbing extending across it for normally closing the vent; and
   pilot means at the center of the ribbing for guiding a point of a drill bit to cut out the ribbing extending across the ring to form an open escape vent.

2. The trap as claimed in claim 1, wherein the ribbing includes a central web structure having a generally conical indent on its outer face at the center of the ring, the indent comprising said pilot means.

3. The trap as claimed in claim 1, including a row of four rings for defining escape vents extending around part of the side wall of the enclosure, each ring having ribbing extending across it and pilot means at the center of the ribbing.

4. The trap as claimed in claim 3, including two diametrically opposed rows of four rings for defining escape vents in the side wall of the enclosure, the rings being spaced a predetermined distance above the bottom wall of the enclosure.

5. The trap as claimed in claim 4, wherein the latticework of the enclosure side walls comprises spaced perpendicular horizontal and vertical ribs, at least one horizontal rib extending across each row of rings, and additional horizontal member extending across each row of rings adjacent said one rib, and a transverse web extending between said one rib and said additional member at the center of each ring, said pilot means comprising an outwardly facing indent in said transverse web.

* * * * *